US010285104B2

(12) United States Patent
Gao et al.

(10) Patent No.: US 10,285,104 B2
(45) Date of Patent: May 7, 2019

(54) CROSS-MENB SWITCHING METHOD AND APPARATUS AND BASE STATION

(71) Applicant: ZTE Corporation, Shenzhen (CN)

(72) Inventors: Yin Gao, Shenzhen (CN); Ying Huang, Shenzhen (CN); Shuang Liang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/563,589

(22) PCT Filed: Sep. 29, 2015

(86) PCT No.: PCT/CN2015/091122
§ 371 (c)(1),
(2) Date: Nov. 16, 2017

(87) PCT Pub. No.: WO2016/161785
PCT Pub. Date: Oct. 13, 2016

(65) Prior Publication Data
US 2018/0092014 A1 Mar. 29, 2018

(30) Foreign Application Priority Data
Apr. 9, 2015 (CN) .......................... 2015 1 0165687

(51) Int. Cl.
H04W 36/00 (2009.01)
H04W 36/22 (2009.01)
(Continued)

(52) U.S. Cl.
CPC ....... H04W 36/22 (2013.01); H04W 36/0016 (2013.01); H04W 36/08 (2013.01); H04W 28/08 (2013.01); H04W 76/36 (2018.02)

(58) Field of Classification Search
CPC .................................................... H04W 36/22
See application file for complete search history.

(56) References Cited

U.S. PATENT DOCUMENTS

2012/0076121 A1 3/2012 Choi
2014/0113637 A1 4/2014 Guan et al.
(Continued)

FOREIGN PATENT DOCUMENTS

CA 2841685 A1 9/2014
CN 101990313 A 3/2011
(Continued)

OTHER PUBLICATIONS

International Search Report in international application No. PCT/CN2015/091122, dated Jan. 18, 2016.
(Continued)

Primary Examiner — Justin Y Lee
(74) Attorney, Agent, or Firm — Oppedahl Patent Law Firm LLC

(57) ABSTRACT

Provided are a cross-Master eNB (MeNB) switching method and apparatus, and a base station. The method comprises: a target MeNB determines that a UE has already established a selected internet protocol traffic offload (SIPTO)/local internet protocol access (LIPA) service on a secondary eNB (SeNB) before the switching; and the target MeNB retains or releases the SIPTO/LIPA service, wherein the user equipment (UE) is accessed to a source MeNB and the SeNB through dual links before the switching, and the UE is accessed to the target MeNB and the SeNB through the dual links after the switching, and a combined local gateway (L-GW) supporting the SIPTO/LIPA service is configured on the SeNB. By means of the present invention, the problem in the related art of not considering the processing of the SIPTO/LIPA service in the cross MeNB switching process is solved, thereby providing an SIPTO/LIPA service processing method in the cross MeNB switching process.

13 Claims, 9 Drawing Sheets

(51) Int. Cl.
*H04W 36/08* (2009.01)
*H04W 28/08* (2009.01)
*H04W 76/36* (2018.01)

(56) References Cited

U.S. PATENT DOCUMENTS

| | | | |
|---|---|---|---|
| 2014/0233532 | A1 | 8/2014 | Xu et al. |
| 2014/0282747 | A1 | 9/2014 | Richman et al. |
| 2014/0293842 | A1 | 10/2014 | He |
| 2014/0293890 | A1 | 10/2014 | Davydov |
| 2014/0293988 | A1 | 10/2014 | Han |
| 2014/0295849 | A1 | 10/2014 | Sirotkin |
| 2015/0029999 | A1 | 1/2015 | Horn et al. |
| 2015/0092665 | A1 | 4/2015 | Choi et al. |
| 2015/0138952 | A1* | 5/2015 | Tamura .................. H04L 45/58 370/225 |
| 2015/0139292 | A1 | 5/2015 | Shirani-Mehr |
| 2015/0146532 | A1 | 5/2015 | Stojanovski |
| 2015/0200718 | A1 | 7/2015 | Sajadieh et al. |
| 2016/0286449 | A1 | 9/2016 | Choi et al. |
| 2016/0373987 | A1* | 12/2016 | Ahmad ................. H04W 76/00 |
| 2017/0134998 | A1* | 5/2017 | Xu .................... H04W 36/0061 |
| 2017/0311211 | A1* | 10/2017 | Chiba ............... H04W 36/0027 |

FOREIGN PATENT DOCUMENTS

| | | |
|---|---|---|
| CN | 102006673 A | 4/2011 |
| CN | 102036216 A | 4/2011 |
| CN | 102595386 A | 7/2012 |
| CN | 102754460 A | 10/2012 |
| CN | 102843739 A | 12/2012 |
| CN | 103096401 A | 5/2013 |
| CN | 103167571 A | 6/2013 |
| EP | 2978261 A1 | 1/2016 |
| WO | 2011023125 A1 | 3/2011 |
| WO | 2014148874 A1 | 9/2014 |
| WO | 2014158275 A1 | 10/2014 |

OTHER PUBLICATIONS

English Translation of the Written Opinion of the International Search Authority in international application No. PCT/CN2015/091122, dated Jan. 18, 2016.

Partial Supplementary European Search Report in European application No. 15888337.1, dated Dec. 22, 2017.

Ericsson: "Support of SIPTO at the Local Network for Dual Connectivity", 3GPP Draft; R3-150327, 3rd Generation Partnership Project (3GPP), Mobile Competence Centre ; 650, Route Des Lucioles ; F-06921 Sophia-Antipolis Cedex ;France vol. RAN WG3, No. Athens, Greece; Feb. 9, 2015-Feb. 13, 2015 Feb. 8, 2015 (Feb. 8, 2015), XP050937078, Retrieved from the Internet: URL:http://www.3gpp.org/ftp/Meeti ngs_3GPP_SYNC/RAN3/Docs/.

Ericsson: "Analysis of inter-MeNB handover without SeNB change", 3GPP Draft; R3-150329, 3rd Generation Partnership Project (3GPP), Mobile Competence Centre ; 650, Route Des Lucioles ; F-06921 Sophia-Antipolis Cedex ;France vol. RAN WG3, No. Athens, Greece; Feb. 9, 2015-Feb. 13, 2015 Feb. 8, 2015 (Feb. 8, 2015), XPO50937080, Retrieved from the Internet: URL:http://www.3gpp.org/ftp/Meeti ngs_3GPP_SYNC/RAN3/Docs/.

ZTE: "Text proposal for the inter-MeNB handover enhancement in dual connectivity", 3GPP Draft; R3-15Q241, 3rd Generation Partnership Project (3GPP), Mobile Competence Centre ; 650, Route Des Lucioles ; F-06921 Sophia-Antipolis Cedex ;France vol. RAN WG3, No. Athens, Greece; Feb. 9, 2015-Feb. 13, 2015 Feb. 8, 2015 (Feb. 8, 2015), XP050936994, Retrieved from the Internet: URL:http://www.3gpp.org/ftp/Meetings 3GPP SYNC/RAN3/Docs/.

ZTE: "Text proposal for the handover enhancement in dual connectivity", 3GPP Draft; R3-150629, 3rd Generation Partnership Project (3GPP), Mobile Competence Centre ; 650, Route Des Lucioles; F-06921 Sophia-Antipolis Cedex ;France 9 vol. RAN WG3, No. Santa Cruz, Spain; Apr. 20, 2015-Apr. 24, 2015 Apr. 11, 2015 (Apr. 11, 2015), XP050937246, Retrieved from the Internet:URL:http://www.3gpp.org/ftp/Meetings_3GPP SYNC/RAN3/Docs/.

* cited by examiner

CROSS-MENB SWITCHING METHOD AND APPARATUS AND BASE STATION

TECHNICAL FIELD

The present disclosure relates to the field of communications, and in particular to a cross-Master eNB (MeNB) switching method and apparatus, and base station.

BACKGROUND

FIG. 1 is a schematic diagram of an overall architecture of a Long Term Evolution (LTE) system in the related art. As shown in FIG. 1, the LTE architecture includes: a Mobility Management Entity (MME), a Serving GetWay (SGW), a user equipment or terminal (UE) and base stations (eNodeBs, short for eNBs). An interface between the UE and the eNB may be an UU interface. An interface between the eNB and MME may be an S1-MME (S1 for the control plane) interface. An interface between the eNB and the SGW may be an S1-U interface. Interfaces between the eNBs may be X2-U (X2-User plane) and an X2-C (X2-Control plane) interfaces.

In the LTE, a protocol stack of the S1-MME interface, from the bottom to up, is divided into the following several protocol layers: an L1 protocol, an L2 protocol, an Internet Protocol (IP), a Stream Control Transmission Protocol (SCTP) and an S1-Application Protocol (S1-AP).

In the LTE, a protocol stack of the S1-U interface, from the bottom to up, is divided into the following several protocol layers: an L1 protocol, an L2 protocol, a User Data Protocol (UDP)/IP, and a General Packet Radio Service (GPRS) Tunneling Protocol-User Plane (GTP-U).

At present, as the frequency spectrum resources are in short supply and the large-traffic services of a mobile user surge, in order to increase the user throughout and enhance the mobile performance, the demand of adopting a high frequency point such as 3.5 GHz to perform hotspot coverage is increasingly obvious and a node with a low power becomes a new application scenario. However, the signals of the high frequency point are attenuated sharply, and the coverage range of a new cell is relatively small and there is no common site between the new cell and the existing cell. As a result, if the user moves among these new cells, or moves between the new cells and the existing cells, a frequent switching process is undoubtedly caused such that user information is frequently transferred among the base stations and thus a huge signaling impact is brought to a core network. In view of this, it is curbed to introduce a large number of small cellular base stations at a wireless side.

FIG. 2 is a schematic diagram of an overall architecture of a small cellular base station system. As shown in FIG. 2, the architecture includes an MME, an SGW, an UE, a master base station eNB (MeNB), and a secondary base station eNB (SeNB). An interface between the UE and the base station may be an UU interface. An interface between the MeNB/SeNB and the SGW may be an S1-U interface. Interfaces between the eNBs may Xn interfaces, The user data may be sent to the user from the core network by means of the MeNB, and also may be sent to the user from the core network by means of the SeNB. Upon access of the user to the MeNB, dual links may be implemented by adding, modifying and deleting the SeNB.

Meanwhile, with extensive requirements of the user to a local service and an internet service, the UE and the core network supports an always online function. That is, after a data link is established, the UE may send the data to an external data network at any time, and the external data network also may send the data to the UE. Herein, the external data network refers to an IP network that does not pertain to a Public Land Mobile Network (PLMN) and has a connection with the PLMN, for example, it may be a home inner network or an internet. We also call the function as a Local IP Access at Local Network (LIPA@LN) or Selected IP Traffic Offload at Local Network (SIPTO@LN) function. If a Local GateWay (L-GW) supporting an LIPA or SIPTO service is arranged on the base station (it also may be a macro base station or a home base station), we call it as a collocated L-GW. The system architecture supporting the SIPTO@LN and the collocated L-GW is as shown in FIG. 3.

Under the existing LTE system, to achieve the SIPTO@LN or LIPA@LN function, in a scenario of the collocated. L-GW, the base station where the collocated L-GW is located needs to report an IP address of the L-GW to the core network by means of a UE dedicated message, such that a Packet Data Network Gateway (PDN GW) for the SIPTO/LIPA service selects to use the address provided by the (H)eNB but not the Domain Name Server (DNS) query, Hence, there is a need for the base station to carry the IP address of the L-GW in an INITIAL UE MESSAGE (sent to the MME and used for security authentication of a Non-Access Stratum (NAS) layer between the network and the UE) and an UPLINK NAS TRANSPORT message. In the above small base station system, since the concepts of the MeNB and the SeNB are introduced, when a cross MeNB switching is performed by the user under the small base station environment, if the base station where the L-GW is located is the SeNB, it is necessary to consider the impact of a switching process on the SIPTO/LIPA service.

An effective solution has not been proposed yet at present for the problem of not considering the processing of the SIPTO/LIPA service in the cross MeNB switching process in the related art.

SUMMARY

To solve the above technical problem, the disclosure provides a cross MeNB switching method and apparatus, and a base station.

According to one aspect of the embodiments of the disclosure, a cross MeNB switching method is provided, which includes: a Target MeNB (T-MeNB) determines that a UE has already established a SIPTO/LIPA service on a SeNB before the switching; and the T-MeNB retains or releases the SIPTO/LIPA service, wherein the UE is accessed to an S-MeNB and the SeNB through dual links before the switching, and the UE is accessed to the T-MeNB and the SeNB through the dual links after the switching, and a collocated L-GW supporting the SIPTO/LIPA service is configured on the SeNB.

Optionally, that in a condition in which the T-MeNB determines to retain the SIPTO/LIPA service, the T-MeNB retains the SIPTO/LIPA service includes: the T-MeNB acquires service bearer information of the SIPTO/LIPA service; the T-MeNB sends the service bearer information to an MME.

Optionally, that in the condition in which the T-MeNB determines to retain the SIPTO/LIPA service, the T-MeNB retains the SIPTO/LIPA service further includes: the T-MeNB sends the service bearer information to the SeNB.

Optionally, the service bearer information includes at least one of the followings: an Evolution Radio Access Bearer Identifier (ERAB ID), a correlation ID, and address information of the L-GW.

Optionally, that the T-MeNB acquires the service bearer information of the SIPTO/LIPA service includes: the T-MeNB receives a switching request from the S-MeNB, wherein the switching request carries the service hearer information.

Optionally, that the T-MeNB sends the service bearer information to the SeNB includes: the T-MeNB sends a SeNB adding request or a SeNB modification request to the SeNB, wherein the SeNB adding request or the SeNB modification request carries the service bearer information.

Optionally, that the T-MeNB sends the service bearer information to the MME includes: the T-MeNB sends a path switching request to the MME, wherein the path switching request carries the service bearer information.

Optionally, that in the condition in which the T-MeNB determines to retain the SIPTO/LIPA service, the T-MeNB retains the SIPTO/LIPA service further includes: the SeNB receives a UE context release message; the SeNB does not release the SIPTO/LIPA service.

Optionally, that in a condition in which the T-MeNB determines to release the SIPTO/LIPA service, the T-MeNB releases the SIPTO/LIPA service includes: the T-MeNB acquires the service bearer information of the SIPTO/LIPA service; the T-MeNB sends the service bearer information to the SeNB to instruct the SeNB to release the SIPTO/LIPA service.

Optionally, that the T-MeNB sends the service hearer information to the SeNB includes: the T-MeNB sends hearer deleting list information to the SeNB, wherein the bearer deleting list information carries the service bearer information.

Optionally, that in a condition in which the T-MeNB determines to release the SIPTO/LIPA service, the T-MeNB releases the SIPTO/LIPA service further includes: the SeNB receives the bearer deleting list information/the SeNB release message/a UE text release message; the SeNB releases the SIPTO/LIPA service according to the bearer deleting list information/the SeNB release message/the UE text release message.

Optionally, after the T-MeNB retains or releases the SIPTO/LIPA service, the method further includes: the T-MeNB at least sends IP address information of the collocated L-GW to the MME.

Optionally, that the T-MeNB at least sends the IP address information of the collocated L-GW to the MME includes: the T-MeNB sends the IP address information of the collocated L-GW and/or indication information used to indicate a position where the collocated L-GW is configured to the MME.

Optionally, the indication information includes one of the followings: a global ID of the SeNB where the collocated L-GW is located, and an indicator used to indicate that the collocated L-GW is located on the SeNB.

According to another aspect of the embodiments of the disclosure, a cross MeNB switching method is further provided, which includes: a T-MeNB acquires IP address information of a collocated L-GW on a SeNB; and the T-MeNB at least sends the IP address information to an MME, wherein a UE is accessed to an source MeNB before the switching, and the UE is accessed to the T-MeNB and the SeNB through dual links after the switching, and the collocated L-GW supporting a SIPTO/LIPA service is configured on the SeNB.

Optionally, that the T-MeNB acquires the IP address information of the collocated L-GW on the SeNB includes: the T-MeNB receives a switching request sent by the source MeNB, wherein the switching request carries the IP address information; or the T-MeNB receives a SeNB adding request confirmation message sent by the SeNB, wherein the SeNB adding request confirmation message carries the IP address information.

Optionally, that the T-MeNB at least sends the IP address information to the MME includes: the T-MeNB sends the IP address information and/or indication information used to indicate a position where the collocated L-GW is configured to the MME.

Optionally, the indication information includes one of the followings: a global ID of the SeNB where the collocated L-GW is located, and an indicator used to indicate that the collocated L-GW is located on the SeNB.

According to another aspect of the embodiments of the disclosure, a cross MeNB switching apparatus is further provided. The cross MeNB switching apparatus is applied to a T-MeNB and includes: a determination module, configured to determine that a UE has already established a SIPTO/LIPA service on a SeNB before the switching; and a processing module, configured to retain or release the SIPTO/LIPA service, wherein the UE is accessed to an source MeNB and the SeNB through dual links before the switching, and the UE is accessed to the T-MeNB and the SeNB through the dual links after the switching, and a collocated L-GW supporting the SIPTO/LIPA service is configured on the SeNB.

Optionally, the processing module includes: a first acquisition unit, configured to acquire service bearer information of the SIPTO/LIPA service; and a first sending unit, configured to send the service hearer information to an MME.

Optionally, the processing module further includes: a second sending unit, configured to send the service bearer information to the SeNB.

Optionally, the service hearer information includes at least one of the followings: an ERAB ID, a correlation ID, and address information of the L-GW.

Optionally, the first acquisition unit is configured to: receive a switching request from the source MeNB, wherein the switching request carries the service bearer information.

Optionally, the second sending unit is configured to send: a SeNB adding request or a SeNB modification request to the SeNB, wherein the SeNB adding request or the SeNB modification request carries the service bearer information.

Optionally, the first sending unit is configured to: send a path switching request to the MME, wherein the path switching request carries the service bearer information.

Optionally, the processing module further includes: a second acquisition unit, configured to acquire the service bearer information of the SIPTO/LIPA service; and a third sending unit, configured to the service bearer information to the SeNB to instruct the SeNB to release the SIPTO/LIPA service.

Optionally, the third sending unit is configured to: send bearer deleting list information to the SeNB, wherein the bearer deleting list information carries the service bearer information.

Optionally, the apparatus further includes: a first sending module, configured to at least send IP address information of the collocated L-GW to the MME.

Optionally, the first sending module is further configured to: send the IP address information of the collocated L-GW and/or indication information used to indicate a position where the collocated L-GW is configured to the MIME.

Optionally, the indication information includes one of the followings: a global ID of the SeNB where the collocated L-GW is located, and an indicator used to indicate that the collocated L-GW is located on the SeNB.

According to another aspect of the embodiments of the disclosure, a base station is further provided, which includes: the above cross MeNB switching apparatus.

According to another aspect of the embodiments of the disclosure, a cross MeNB switching apparatus is further provided. The cross MeNB switching apparatus is applied to a T-MeNB and includes: an acquisition module, configured to acquire IP address information of a collocated L-GW on a SeNB; and a second sending module, configured to at least send the IP address information to an MME, wherein a UE is accessed to an source MeNB before the switching, and the UE is accessed to the T-MeNB and the SeNB through dual links after the switching, and the collocated L-GW supporting a SIPTO/LIPA service is configured on the SeNB.

Optionally, the acquisition module is further configured to: receive a switching request sent by the source MeNB, wherein the switching request carries the IP address information; or receive a SeNB adding request confirmation message sent by the SeNB, wherein the SeNB adding request confirmation message carries the IP address information.

Optionally, the second sending module is further configured to: send the IP address information and/or indication information used to indicate a position where the collocated L-GW is configured to the MME.

Optionally, the indication information includes one of the followings: a global ID of the SeNB where the collocated L-GW is located, and an indicator used to indicate that the collocated L-GW is located on the SeNB.

According to another aspect of the embodiments of the disclosure, a base station is further provided, which includes: the above cross MeNB switching apparatus.

By means of the embodiments of the disclosure, the T-MeNB determines that the UE has already established the SIPTO/LIPA service on the SeNB before the switching, and the T-MeNB retains or releases the SIPTO/LIPA service, wherein the UE is accessed to the source MeNB and the SeNB through the dual links before the switching, and the UE is accessed to the T-MeNB and the SeNB through the dual links after the switching, and the collocated L-GW supporting the SIPTO/LIPA service is configured on the SeNB, so the problem in the related art of not considering the processing of the SIPTO/LIPA service in the cross MeNB switching process is solved, thereby providing a SIPTO/LIPA service processing method in the cross MeNB switching process.

BRIEF DESCRIPTION OF DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings.

DETAILED DESCRIPTION

The disclosure will be described below with reference to the drawings and embodiments in detail. It should be noted that the embodiments of the present application and the characteristics of the embodiments may be combined with each other if there is no conflict.

Other characteristics and advantages of the disclosure will be described. hereinafter, and will become partially obvious from the specification or be understood by way of implementing the disclosure. The objectives and other advantages of the disclosure may be achieved and obtained using a structure specifically indicated by the specification, claims and accompanying drawings.

To better understand the solutions of the disclosure by a person skilled in the art, the following clearly and completely describes the technical solutions in the embodiments of the disclosure with reference to the accompanying drawings in the embodiments of the disclosure. Apparently, the described embodiments merely are a part not all of the embodiments of the disclosure. All other embodiments obtained by the person of ordinary skill in the art based on the embodiments of the disclosure without creative efforts shall fall within the protection scope of the disclosure.

Figure 1:
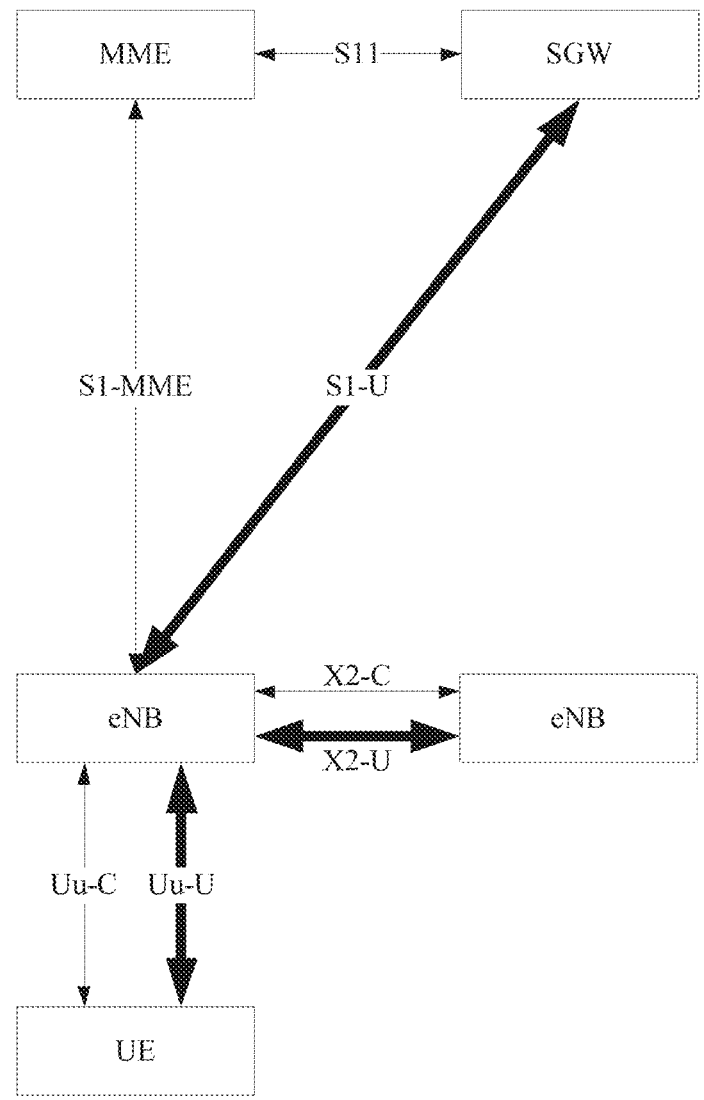
FIG. 1 is a schematic diagram of an overall architecture of an LTE according to the related art.
Figure 2:
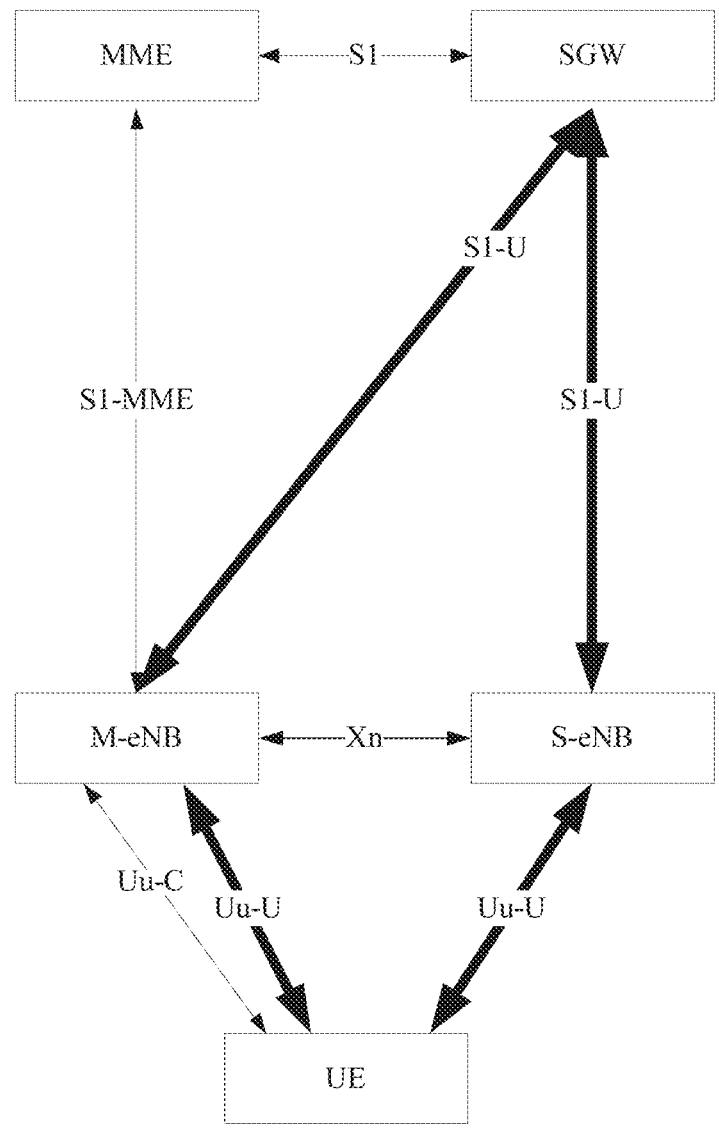
FIG. 2 is a schematic diagram of a 1A architecture of a user plane with dual links under a scenario of a small base station according to the related art.
Figure 3:
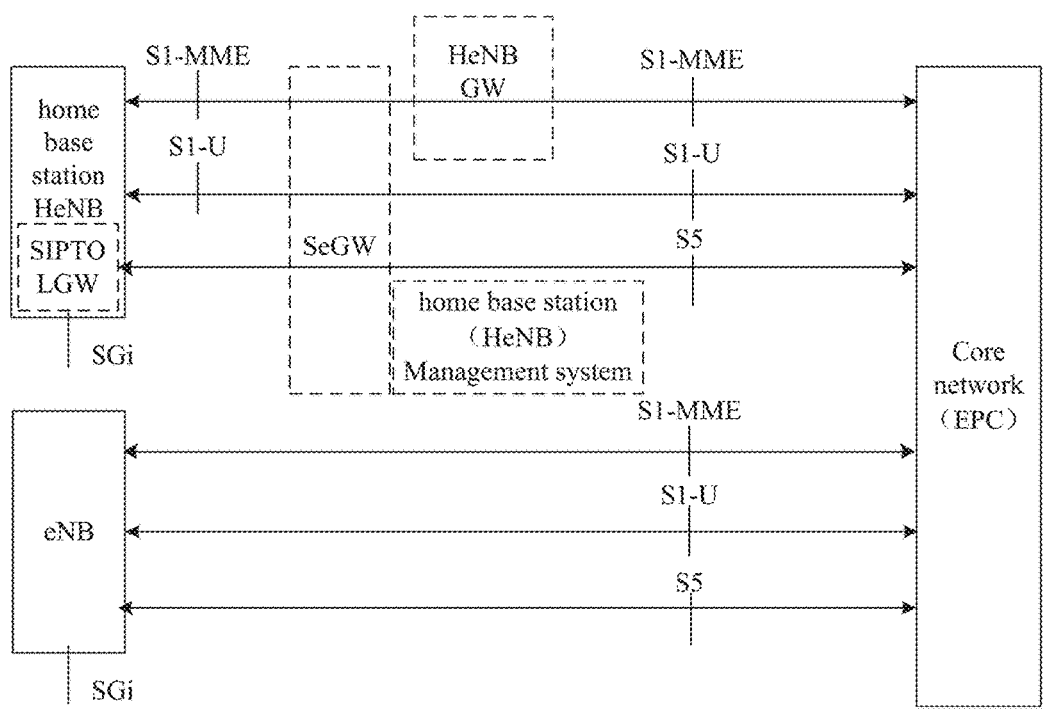
FIG. 3 is a schematic diagram of an architecture supporting a SIPTO@ALN and supporting a collocated L-GW on a SeNB according to the related art.
Figure 4:
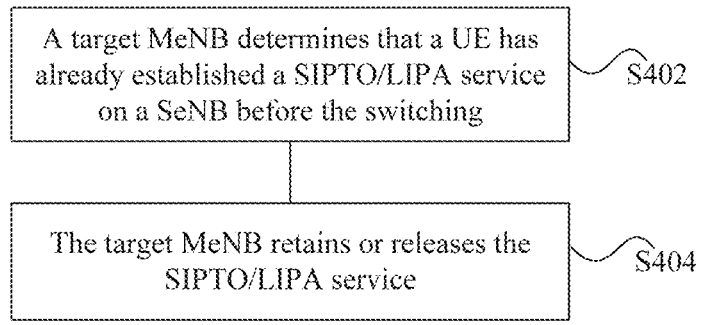
FIG. 4 is a first flowchart of a cross MeNB switching method according to an embodiment of the disclosure.

An embodiment of the disclosure provides a cross MeNB switching method. FIG. 4 is a first flowchart of a cross MeNB switching method according to an embodiment of the disclosure. As shown in FIG. 4, the flowchart includes the following steps.

In step S402, a target MeNB determines that a UE has already established a SIPTO/LIPA service on a SeNB before switching.

In step S404, the target MeNB retains or releases the SIPTO/LIPA service.

The UE is accessed to a source MeNB and the SeNB through dual links before the switching. The UE is accessed to the target MeNB and the SeNB through the dual links after the switching. A collocated L-GW supporting the SIPTO/LIPA service is arranged on the SeNB.

By means of the above steps, a SIPTO/LIPA service processing method when the dual links are switched to another dual links in the cross MeNB switching is provided, such that the problem in the related art of not considering the processing of the SIPTO/LIPA service in the cross MeNB switching process is solved.

Optionally, in a condition in which the target MeNB determines to retain the SIPTO/LIPA service, retaining, by the target MeNB, the SIPTO/LIPA service in the step S404 includes: the target MeNB acquires service bearer information of the SIPTO/LIPA service; the target MeNB sends the service bearer information to an MME. In such a way, a method for sending the service bearer information in the switching process is provided.

Optionally, in the step S404, retaining, by the target MeNB, the SIPTO/LIPA service further includes: the target MeNB sends the service bearer information to the SeNB.

Optionally, the service bearer information includes at least one of the followings: an ERAB ID, a correlation ID, or address information of the L-GW.

Optionally, acquiring, by the target MeNB, the service bearer information of the SIPTO/LIPA service includes: the T-MeNB receives a switching request from the source MeNB, where the switching request carries the service bearer information. In such a way, a method for acquiring the service bearer information via the switching request is provided.

Optionally, sending, by the target MeNB, the service bearer information to the SeNB includes: the T-MeNB sends a SeNB adding request or a SeNB modification request to the SeNB, where the SeNB adding request or the SeNB modification request carries the service bearer information. In such a way, a method for sending the service bearer information via the SeNB adding request or the SeNB modification request is provided.

Optionally, sending, by the target MeNB, the service hearer information to the MME includes: the target MeNB sends a path switching request to the MME, where the path switching request carries the service bearer information. In such a way, a method for reporting the service bearer information to the MME via the path switching request is provided.

Optionally, in order to release other services related to the UE, of the SeNB before the switching, in a condition in which the target MeNB determines to retain the SIPTO/LIPA service, retaining, by the target MeNB, the SIPTO/LIPA service further includes: the SeNB receives a UE context release message; the SeNB does not release the SIPTO/LIPA service, but can release the other services of the UE except for the SIPTO/LIPA service. In such a way, the other services on the SeNB before the switching mat be released, and the SIPTO/LIPA service indicated in the service bearer information is retained.

Optionally, in the condition in which the T-MeNB determines to release the SIPTO/LIPA service, in the step S404, releasing, by the target MeNB, the SIPTO/LIPA service includes: the T-MeNB acquires the service bearer information of the SIPTO/LIPA service: the T-MeNB sends the service bearer information to the SeNB to instruct the SeNB to release the SIPTO/LIPA service. In such a way, a method for releasing the SIPTO/LIPA service is provided.

Optionally, sending, by the target MeNB, the service bearer information to the SeNB includes: the T-MeNB sends bearer deleting list information to the SeNB, where the bearer deleting list information carries the service bearer information. In such a way, a method for releasing the SIPTO/LIPA service via a bearer deleting list is provided.

Optionally, to release the SIPTO/LIPA service on the SeNB, in a condition in which the T-MeNB determines to release the SIPTO/LIPA service, releasing, by the target MeNB, the SIPTO/LIPA service further includes: the SeNB receives the bearer deleting list information/the SeNB release message/a UE text release message; the SeNB releases the SIPTO/LIPA service according to the bearer deleting list information/the SeNB release message/the UE text release message, In such a way, the release of the SIPTO/LIPA service on the SeNB is implemented.

Optionally, after the T-MeNB retains or releases the SIPTO/LIPA service, the method further includes: the T-MeNB sends at least IP address information of the collocated L-GW to the MME. In such a way, the core network may establish a SIPTO/LIPA@LN service subsequently according to the address information, reported by the MeNB, of the collocated L-GW.

Optionally, sending, by the target MeNB, at least the IP address information of the collocated L-GW to the MME includes: the T-MeNB sends, to the MME, the IP address information of the collocated L-GW and/or indication information used to indicate a position where the collocated L-GW is arranged.

The indication information includes one of the followings: a global ID of the SeNB where the collocated L-GW is located: or an indicator used to indicate that the collocated L-GW is located on the SeNB.

Figure 5:
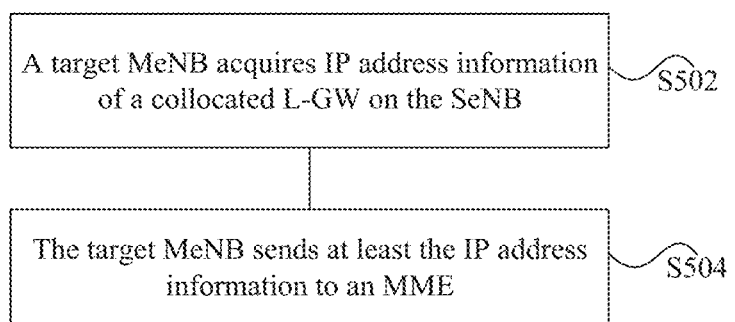
FIG. 5 is a second flowchart of a cross MeNB switching method according to an embodiment of the disclosure.

An embodiment of the disclosure further provides a cross MeNB switching method. The method is applied to a dual-link process when a source MeNB is switched to a target MeNB and a SeNB. FIG. 5 is a second flowchart of a cross MeNB switching method according to an embodiment of the disclosure. As shown in FIG. 5, the flowchart includes the following steps.

In step S502, a target MeNB acquires IP address information of a collocated L-GW on a SeNB.

In step S504, the target MeNB sends at least the IP address information to an MME.

A UE is accessed to a source MeNB before switching, and the UE is accessed to the T-MeNB and the SeNB through dual links after the switching, and the collocated L-GW supporting a SIPTO/LIPA service is arranged on the SeNB.

By means of the above steps, a SIPTO/LIPA service processing method when a single link is switched to dual links is provided, such that the problem in the related art of not considering the processing of the SIPTO/LIPA service in the cross MeNB switching process is solved.

Optionally, in the step S502, acquiring, by the target MeNB, at least the IP address information of the collocated L-GW on the SeNB includes: the target MeNB receives a switching request sent by the source MeNB, where the switching request carries the IP address information; or the T-MeNB receives a SeNB adding request confirmation message sent by the SeNB, the SeNB adding request confirmation message carrying the IP address information.

Optionally, in the step S504, sending, by that the target MeNB, at least the IP address information to the MME includes: the target MeNB sends, to the MME, the IP address information and/or indication information used to indicate a position where the collocated L-GW is arranged.

Optionally, the indication information includes one of the followings: a global identifier of the SeNB where the collocated L-GW is located: or an indicator used to indicate that the collocated L-GW is located on the SeNB.

An embodiment of the disclosure further provides a cross MeNB switching apparatus. The apparatus is configured to implement the above-mentioned embodiments and the preferred implementation manners; and with regard to the part that has been described, no further description is needed. Hereinafter, modules involved in the apparatus will be described. As used in the followings, term "module" can achieve a combination of software and/or hardware with predetermined functions. Although the apparatus described by the following embodiments is preferably implemented by the software, it may also be contemplated to be implemented by the hardware or the combination of the software and the hardware.

Figure 6:
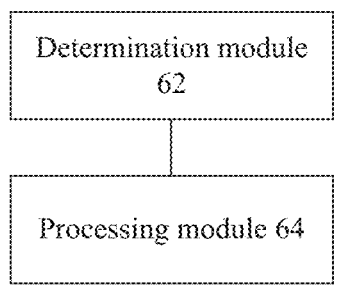
FIG. 6 is a first structure diagram of a cross MeNB switching apparatus according to an embodiment of the disclosure.

FIG. 6 is a first structure diagram of a cross MeNB switching apparatus according to an embodiment of the disclosure. The apparatus is applied to a target MeNB. As shown in FIG. 6, the apparatus includes: a determination module 62 and a processing module 64. The determination module 62 is configured to determine that a UE has already established a SIPTO/LIPA service on a SeNB before switching. The processing module 64 is configured to retain or release the SIPTO/LIPA service. The UE is accessed to a source MeNB and the SeNB through dual links before the switching. The UE is accessed to the T-MeNB and the SeNB through the dual links after the switching. A collocated L-GW supporting the SIPTO/LIPA service is arranged on the SeNB.

Figure 7:
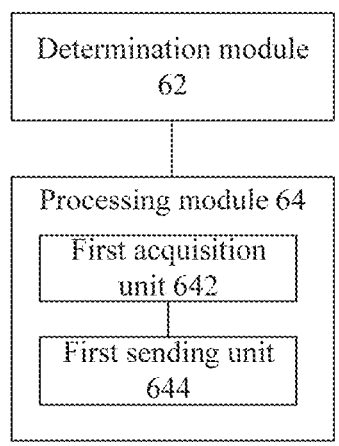
FIG. 7 is a first optional structure diagram of a cross MeNB switching apparatus according to an embodiment of the disclosure.

FIG. 7 is a first optional structure diagram of a cross MeNB switching apparatus according to an embodiment of the disclosure. As shown in FIG. 7, optionally, the processing module 64 includes: a first acquisition unit 642, configured to acquire service bearer information of the SIPTO/LIPA service; and a first sending unit 644, configured to send the service bearer information to an MME.

Figure 8:
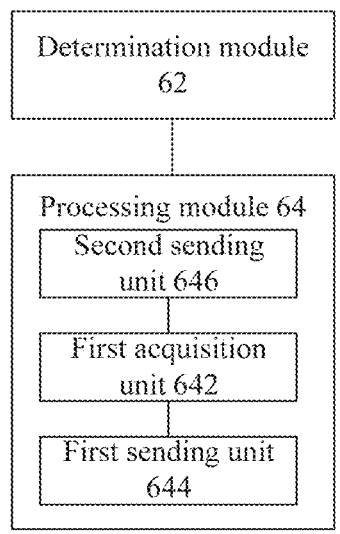
FIG. 8 is a second optional structure diagram of a cross MeNB switching apparatus according to an embodiment of the disclosure.

FIG. 8 is a second optional structure diagram of a cross MeNB switching apparatus according to an embodiment of the disclosure. As shown in FIG. 8, optionally, the processing module 64 further includes: a second sending unit 646, configured to send the service bearer information to the SeNB.

Optionally, the service bearer information includes at least one of the followings: an ERAB ID, a correlation ID, or address information of the L-GW.

Optionally, the first acquisition unit 642 is configured to receive a switching request from the source MeNB, where the switching request carries the service bearer information.

Optionally, the second sending unit 646 is configured to send a SeNB adding request or a SeNB modification request to the SeNB, where the SeNB adding request or the SeNB modification request carries the service bearer information.

Optionally, the first sending unit 644 is configured to send a path switching request to the MME, where the path switching request carries the service bearer information.

Figure 9:
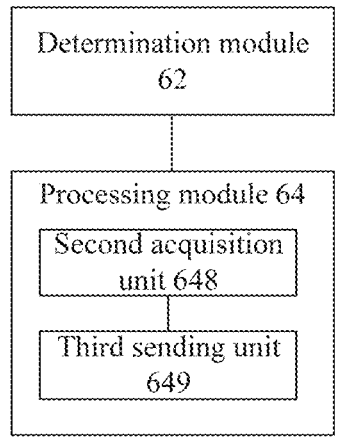
FIG. 9 is a third optional structure diagram of a cross MeNB switching apparatus according to an embodiment of the disclosure.

FIG. 9 is a third optional structure diagram of a cross MeNB switching apparatus according to an embodiment of the disclosure. As shown in FIG. 9, optionally, the processing module 64 further includes: a second acquisition unit 648, configured to acquire the service bearer information of the SIPTO/LIPA service; and a third sending unit 649, configured to the service bearer information to the SeNB to instruct the SeNB to release the SIPTO/LIPA service.

Optionally, the third sending unit 649 is configured to send bearer deleting list information to the SeNB, where the bearer deleting list information carries the service bearer information.

Figure 10:
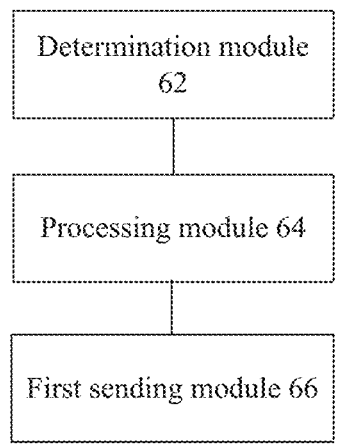
FIG. 10 is a fourth optional structure diagram of a cross MeNB switching apparatus according to an embodiment of the disclosure.

FIG. 10 is a fourth optional structure diagram of a cross MeNB switching apparatus according to an embodiment of the disclosure. As shown in FIG. 9, optionally, the apparatus further includes: a first sending module 66, coupled to the processing module 64 and configured to send at least IP address information of the collocated L-GW to the MME.

Optionally, the first sending module 66 is further configured to send, to the MME, the IP address information of the collocated L-GW and/or indication information used to indicate a position where the collocated L-GW is arranged.

Optionally, the indication information includes one of the followings: a global ID of the SeNB where the collocated. L-GW is located; or an indicator used to indicate that the collocated L-GW is located on the SeNB.

An embodiment of the disclosure further provides a base station including the above cross MeNB switching apparatus.

Figure 11:
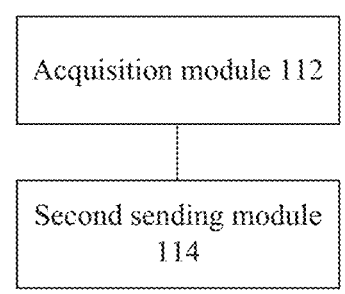
FIG. 11 is a second structure diagram of a cross MeNB switching apparatus according to an embodiment of the disclosure.

An embodiment of the disclosure further provides a cross MeNB switching apparatus, which is applied to a target MeNB. FIG. 11 is a second structure diagram of a cross MeNB switching apparatus according to an embodiment of the disclosure. As shown in FIG. 11, the apparatus includes: an acquisition module 112 and a second sending module 114. The acquisition module 112 is configured to acquire IP address information of a collocated L-GW on a SeNB. The second sending module 114 is coupled to the acquisition module 112 and is configured to send at least the IP address information to an MME. A UE is accessed to a source MeNB before the switching. The UE is accessed to the T-MeNB and the SeNB through dual links after the switching. The collocated L-GW supporting a SIPTO/LIPA service is arranged on the SeNB.

Optionally, the acquisition module 112 is further configured to receive a switching request sent by the source MeNB, where the switching request carries the IP address information; or receive a SeNB adding request confirmation message sent by the SeNB, where the SeNB adding request confirmation message carries the IP address information.

Optionally, the second sending module 114 is further configured to send, to the MME, the IP address information and/or indication information used to indicate a position where the collocated L-GW is arranged.

Optionally, the indication information includes one of the followings: a global ID of the SeNB where the collocated L-GW is located; or an indicator used to indicate that the collocated L-GW is located on the SeNB.

An embodiment of the disclosure further provides a base station including the above cross MeNB switching apparatus.

Moreover, function units disclosed according to the embodiments of the disclosure may be integrated into one processing unit, or the units are physically independent from each other, or two or more function units may be integrated into one unit. The integrated units may be implemented through hardware or through a software function unit.

To describe the embodiments of the disclosure more clearly, the following will describe and illustrate with reference to alternate embodiments.

An alternate embodiment of the disclosure provides a method for implementing switching under a small base station environment, so as to effectively implement SIPTO@LN or LIPA@ALN, which is a problem to be solved by the embodiments of the disclosure, in a switching scenario of the small base station.

An alternate embodiment of the disclosure provides a method for implementing switching under a small base station environment, so as to respectively optimize the processing of a SIPTO/LIPA service in two scenarios in which a single link is switched into dual links and the dual links are switched into dual links.

In the scenario in which the single link is switched into the dual link, i.e., the base station linked by the UE before the switching is called as a switching source base station, the UE implements the dual links with a switching target MeNB and a SeNB after the switching. Herein, a collocated L-GW of the SIPTO/LIPA@LN is arranged on the SeNB.

In a switching process, the target MeNB acquires IP address information of the collocated L-GW on the SeNB. The target MeNB may acquire the IP address information by means of a switching request message sent by the source base station and also may acquire the IP address information by means of a SeNB adding request confirmation message between the SeNB and the target MeNB.

The target MeNB may send the IP address information of the collocated L-GW on the SeNB to the MME by means of a path switching request message.

Optionally, the IP address information may further include indication information to indicate whether the L-GW is located on the MeNB or the SeNB. The indication information may be in one or more forms of the followings: a global identifier of the SeNB where the L-GW is located; or an indicator of the SeNB where the L-GW is located.

After the switching is finished, the user can establish a SIPTO/LIPA@LN service on the SeNB.

In the scenario in which the dual links are switched into the dual links, i.e., the UE is in dual links before the switching and is linked to the source MeNB and the SeNB, the UE is accessed to the T-MeNB and the SeNB through the dual links after the switching, where the SeNB is retained unchanged. Herein, the collocated L-GW of the SIPTO/LIPA@LN is arranged on the SeNB.

If the SIPTO/LIPA service is already established on the SeNB before the switching, the SIPTO/LIPA service may be retained or released in the switching process.

A) The SIPTO Service is Retained Unchanged

The target MeNB acquires SIPTO/LIPA service bearer information of the UE at a switching source side. The SIPTO/LIPA service bearer information (such as an ERAB ID, a correlation ID and address information of the L-GW) may be sent to the target MeNB by means of the source MeNB in the switching request message.

If the target MeNB determines to retain the SIPTO service unchanged, there is a need to carry the SIPTO/LIPA bearer information such as the ERAB ID, the correlation ID and the address information of the L-GW in a handshaking process with the SeNB. For example, the SIPTO/LIPA bearer information is carried in a SeNB adding request or SeNB modification request message.

The target MeNB sends the SIPTO/LIPA bearer information (such as the ERAB ID, the correlation ID and the address information of the L-GW) retained. unchanged on the SeNB to an MME by means of a path switching request message.

Optionally, the target MeNB may send the IP address information of the collocated L-GW on the SeNB to the MME, or may further include the indication information to indicate whether the L-GW is located on the MeNB or the SeNB. The indication information may be in one or more forms of the followings: the global ID of the SeNB where the L-GW is located; or the indicator of the SeNB where the L-GW is located.

After the switching process is finished, when the SeNB receives a UE text release message, the SeNB should not release the SIPTO/LIPA bearer.

B) The SIPTO Service is Released

The target MeNB acquires SIPTO/LIPA service bearer information of the UE at a switching source side. The SIPTO/LIPA service bearer information (such as an ERAB ID, a correlation ID and address information of the L-GW) may be sent to the target MeNB by means of the source MeNB in the switching request message.

If the target MeNB determines to release the SIPTO service, there is a need to notify the SeNB in a handshaking process with the SeNB. For example, the SIPTO/LIPA bearer information is present in a bearer deleting list. The SeNB releases a local SIPTO/LIPA service. The SeNB may locally release the SIPTO/LIPA service during the handshaking process, or after receiving a SeNB release message or upon reception of a UE text release message after the switching process is finished.

The target MeNB may send the IP address information of the collocated L-GW on the SeNB to the MME by means of a path switching request message.

Optionally, the target MeNB may further include the indication information to indicate whether the L-GW is located on the MeNB or the SeNB. The indication information may be in one or more forms of the followings: the global ID of the SeNB where the L-GW is located; or the indicator of the SeNB where the L-GW is located.

It is to be noted that the disclosure is not limited to the LTE system and is also applicable to a third communication system (a 3G system).

The above switching scenarios will be described below respectively in conjunction with alternate embodiments.

First Alternate Embodiment

Figure 12:
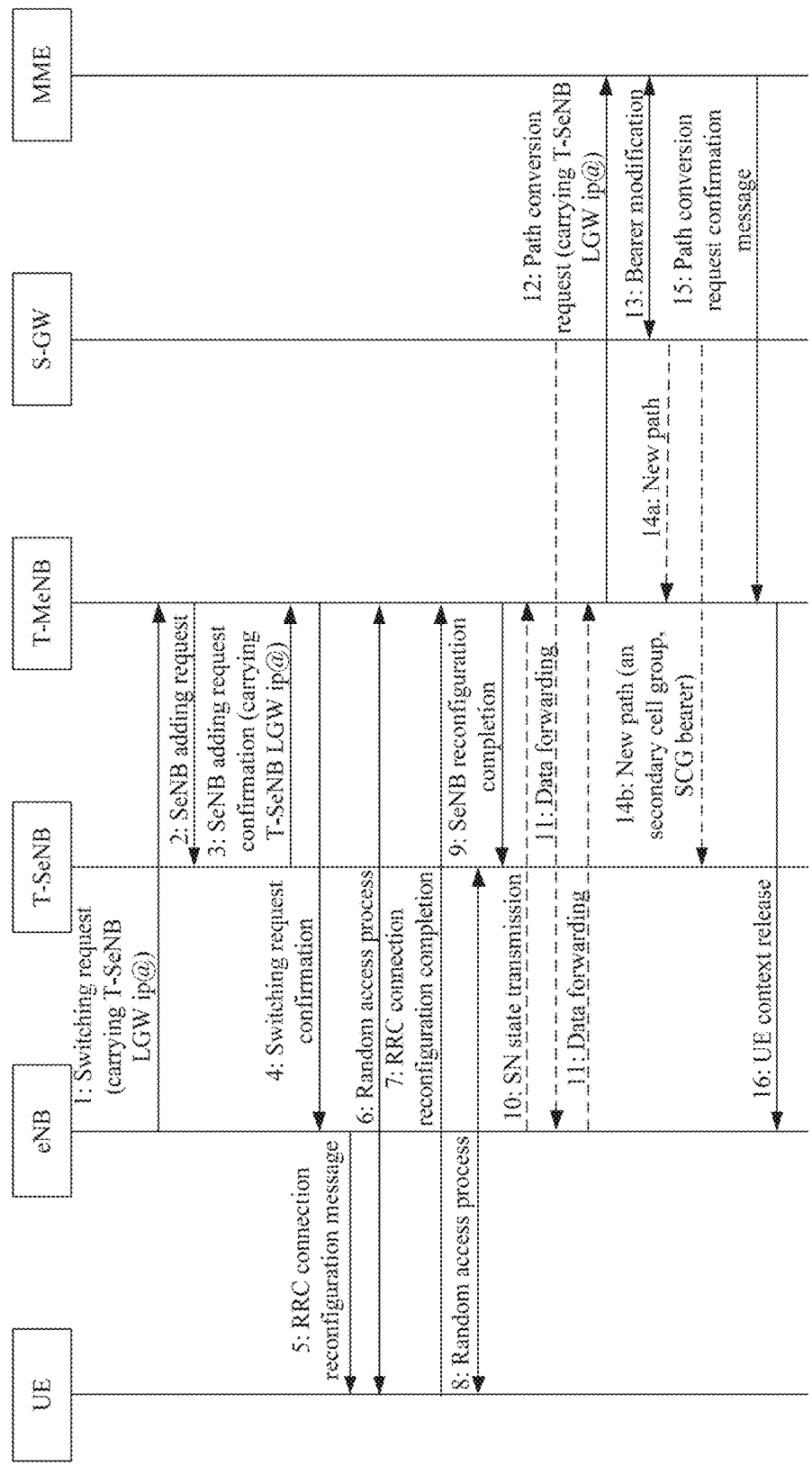
FIG. 12 is a flowchart of a cross MeNB switching method according to a first alternate embodiment of the disclosure.

As shown in FIG. 12, the method of this alternate embodiment of the disclosure includes the following steps.

Scenario 1:The single link is switched into the dual links. The collocated L-GW is arranged on the SeNB. The UE is in the single link before switching. The UE implements the dual links after the switching and a SIPTO/LIPA bearer is established on the SeNB.

In step 1: the source MeNB (S-MeNB) sends an X2 switching request message to the target MeNB (T-MeNB). Herein, the IP address information of the collocated. L-GW on the SeNB may be included. The source MeNB may acquire the IP address information of the collocated L-GW on the SeNB by means of an X2 interface process. Optionally, the indication information to indicate whether the L-GW is the MeNB or the SeNB is included.

In step 2: the T-MeNB sends a SeNB adding request message to the SeNB according to dual link indication information in the X2 switching request message.

In step 3: the SeNB replies a SeNB adding request confirmation message to the T-MeNB. The IP address information of the collocated L-GW on the SeNB may be included.

In step 4: the T-MeNB replies an X2 switching request confirmation message to the source MeNB.

In steps 5-8: air interfaces of the UE are in synchronization and are accessed to the T-MeNB and the SeNB.

In step 9: the T-MeNB sends a SeNB reconfiguration completion message to the SeNB.

In steps 10-11: the T-MeNB sends a Sequence Number (SN) state transmission message to the SeNB and starts data forwarding.

In steps 12-14: the T-MeNB sends a path switching request message to an MME to notify a new downlink path (from source MeNB->T-MeNB). The path switching request may include the IP address information of the collocated L-GW on the SeNB. Optionally, the indication information to indicate whether the L-GW is the MeNB or the SeNB is included. The core network may use the address information of the collocated L-GW reported by the MeNB to establish the SIPTO/LIPA@LN service later.

In step 15: the MME replies a path switching request confirmation message to the T-MeNB.

In step 16: the T-MeNB sends a UE context release message to the source MeNB, thereby triggering to release resources in the source MeNB.

Second Alternate Embodiment

Figure 13:
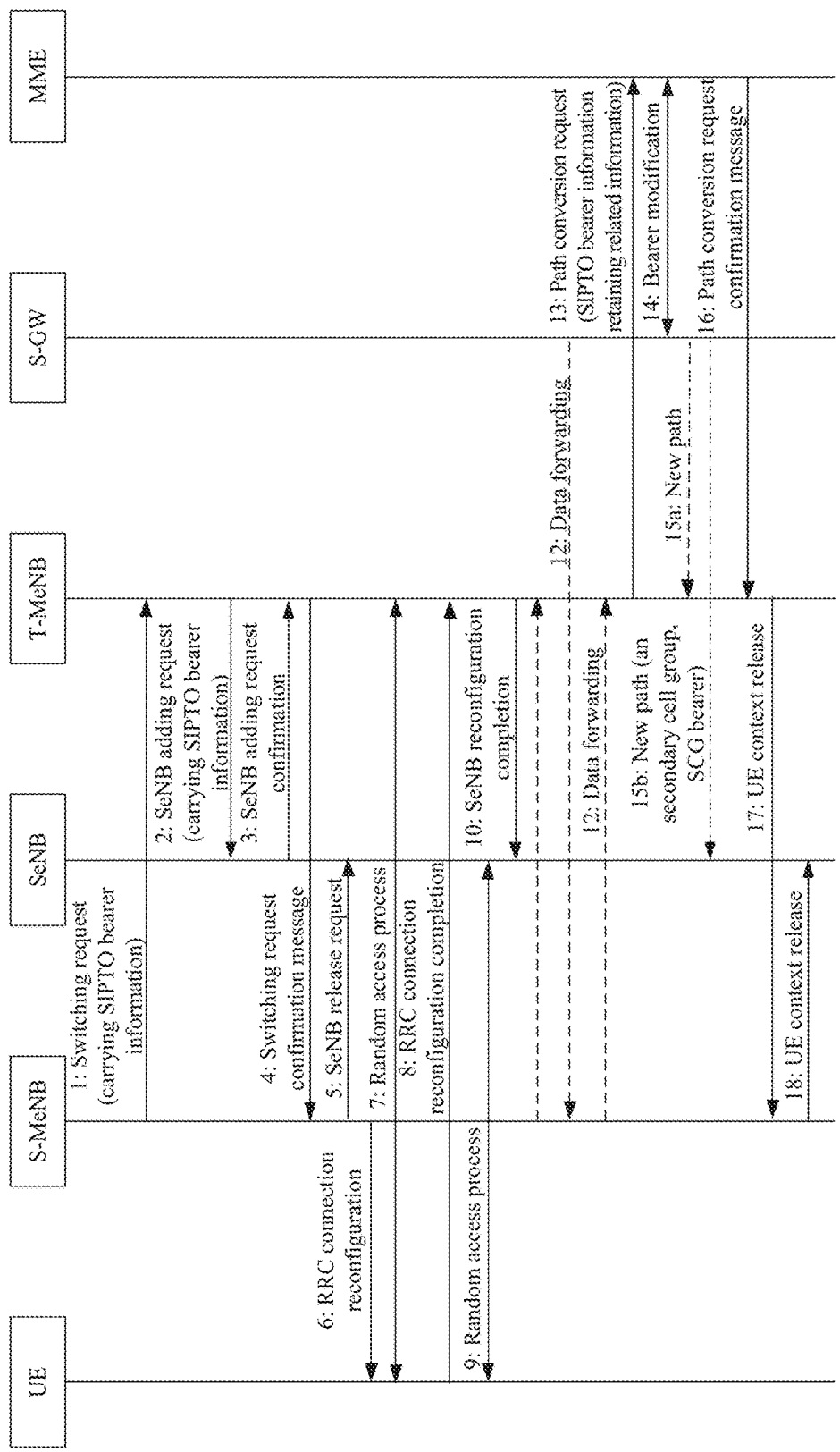
FIG. 13 is a flowchart of a cross MeNB switching method according to a second alternate embodiment of the disclosure.

As shown in FIG. 13, the method of an alternate embodiment of the disclosure includes the following steps.

Scenario 2: the dual links are switched into the dual links. The UE is in the dual links before the switching and is linked with the switching source MeNB and the SeNB. The UE is accessed to the switching target MeNB and the SeNB through the dual links after the switching, where the SeNB is retained unchanged. Herein, the collocated L-GW of the SIPTO/LIPA@LN is arranged on the SeNB. The SIPTO/LIPA service is retained unchanged before and after the switching.

In step 1: the source MeNB sends an X2 switching request message to the T-MeNB. Herein, the SIPTO/LIPA bearer information (such as an ERAD ID, a correlation ID and address information of the L-GW) is included.

In step 2: the T-MeNB sends a SeNB adding request message to the SeNB according to dual link indication information in the X2 switching request message. If the T-MeNB determines to retain the SIPTO/LIPA service unchanged, the SeNB adding request message includes the SIPTO/LIPA bearer information (such as the ERAD ID, the correlation ID and the address information of the L-GW).

In step 3: the SeNB replies a SeNB adding request confirmation message to the T-MeNB.

In step 4: the T-MeNB replies an X2 switching request confirmation message to the S-MeNB.

In step 5: the S-MeNB sends a SeNB release message to the SeNB and the SeNB stops to send data to the UE.

In steps 6-9: air interfaces of the UE are in synchronization and are accessed to the T-MeNB and the SeNB.

In step 10: the T-MeNB sends a SeNB reconfiguration completion message to the SeNB.

In steps 11-12: the T-MeNB sends an SN state transmission message to the SeNB and starts data forwarding.

In steps 13-15: the T-MeNB sends a path switching request message to an MME to notify a new downlink path (from S-MeNB->T-MeNB). The T-MeNB sends the SIPTO/LIPA bearer information (such as the ERAD ID, the correlation ID and the address information of the L-GW) retained unchanged on the SeNB to the MME by means of the path switching request message. Optionally, the T-MeNB may send the IP address information of the collocated L-GW on the SeNB to the MME, or may further include indication information to indicate whether the L-GW is the MeNB or the SeNB. The indication information may be in one or more representation forms of the followings: a global ID of the SeNB where the L-GW is located or an indicator of the L-GW where the L-GW is located. The core network may use the address information of the collocated L-GW reported by the MeNB to establish the SIPTO/LIPA service later.

In step 16: the MME replies a path switching request confirmation message to the T-MeNB.

In step 17: the T-MeNB sends a UE context release message to the S-MeNB, thereby triggering to release resources in the S-MeNB.

In step 18: the S-MeNB may send the UE context release message to the SeNB. At this time, the SeNB only releases a local resource associated with the UE and the S-MeNB. After the switching, the service retained on the SeNB is not released, including the SIPTO/LIPA service.

Third Alternate Embodiment

Figure 14:
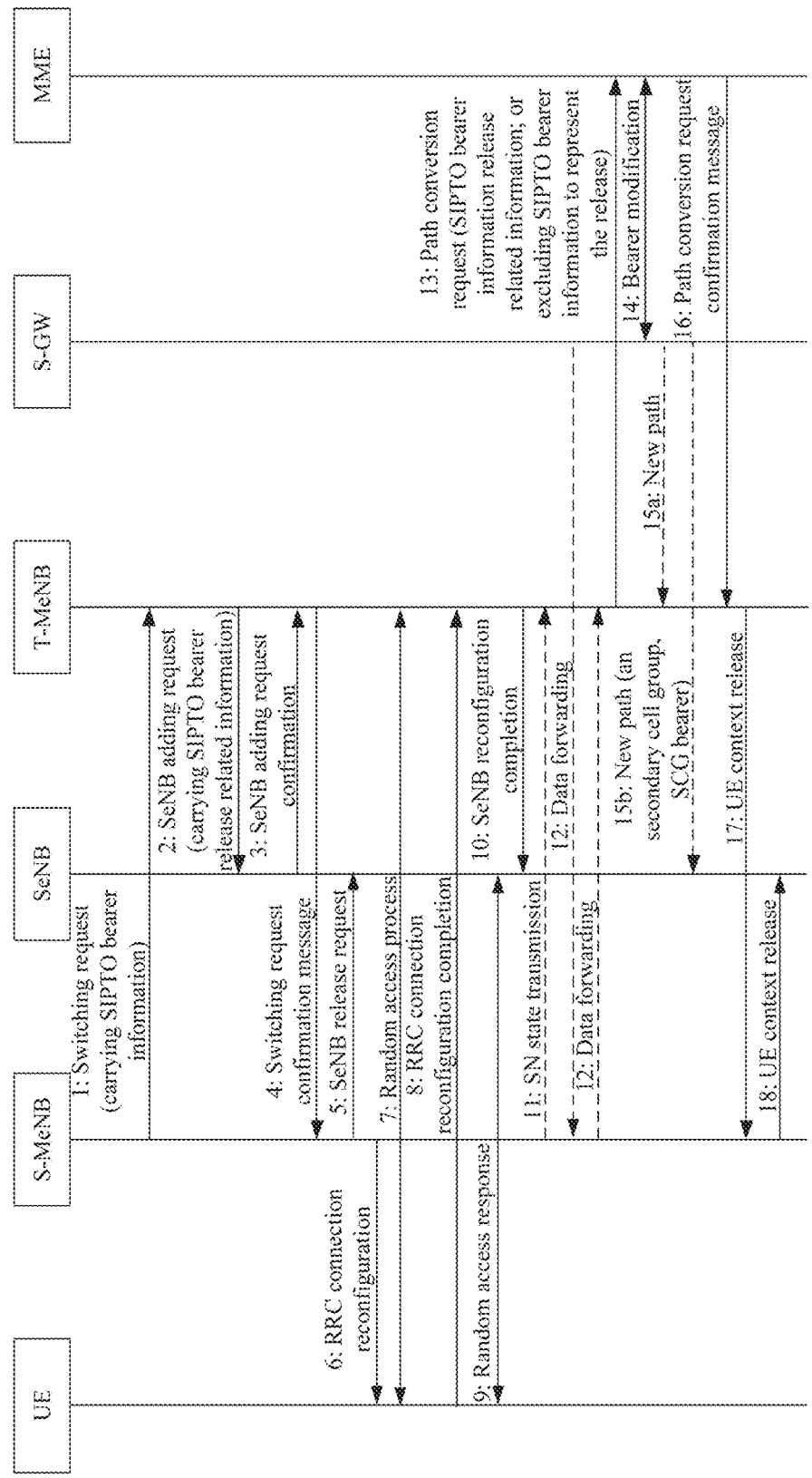
FIG. 14 is a flowchart of a cross MeNB switching method according to a third alternate embodiment of the disclosure.

As shown in FIG. 14, the method of an alternate embodiment of the disclosure includes the following steps.

Scenario 3: the dual links are switched into the dual links. The UE is in the dual links before the switching and is linked with the switching S-MeNB and the SeNB. The UE is accessed to the switching T-MeNB and the SeNB through the dual links after the switching, wherein the SeNB is retained unchanged. Herein, the collocated L-GW of the SIPTO/LIPA@LN is arranged on the SeNB. The SIPTO/LIPA service is released after the switching.

In step 1: the S-MeNB sends an X2 switching request message to the T-MeNB. Herein, the SIPTO/LIPA bearer information (such as an ERAD ID, a correlation ID and address information of the L-GW) is included.

In step 2: the T-MeNB sends a SeNB adding request message to the SeNB according to dual link indication information in the X2 switching request message. If the T-MeNB determines to release the SIPTO/LIPA service, the SeNB adding request message includes the SIPTO/LIPA bearer information to he released.

In step 3: the SeNB replies a SeNB adding request confirmation message to the T-MeNB.

In step 4: the T-MeNB replies an X2 switching request confirmation message to the S-MeNB.

In step 5: the S-MeNB sends a SeNB release message to the SeNB and the SeNB stops to send data to the UE.

In steps 6-9: air interfaces of the UE are in synchronization and are accessed to the T-MeNB and the SeNB.

In step 10: the T-MeNB sends a SeNB reconfiguration completion message to the SeNB.

In steps 11-12: the T-MeNB sends an SN state transmission message to the SeNB and starts data forwarding.

In steps 13-15: the T-MeNB sends a path switching request message to an MME to notify a new downlink path (from S-MeNB->T-MeNB). The target MeNB sends the SIPTO/LIPA bearer information (such as an ERAD ID, a correlation ID and address information of the L-GW) to be released on the SeNB to the MME by means of the path switching request message. Optionally, the target MeNB may send the IP address information of the collocated L-GW on the SeNB to the MME, or may further include indication information to indicate whether the L-GW is the MeNB or the SeNB. The indication information may be in one or more representation forms of the followings: a global ID of the SeNB where the L-GW is located; or an indicator of the L-GW where the L-GW is located. The core network may use the address information of the collocated L-GW reported by the MeNB, to establish the SIPTO/LIPA service later.

In step 16: the MME replies a path switching request confirmation message to the T-MeNB.

In step 17: the T-MeNB sends a UE context release message to the S-MeNB, thereby triggering to release resources in the S-MeNB.

In step 18: the S-MeNB may send the UE context release message to the SeNB.

Herein, the SeNB may locally release the SIPTO/LIPA service during the handshaking process with the T-MeNB, or after receiving a SeNB release message or upon reception of a UE text release message after the switching process is finished.

Optionally, whether to release the SIPTO/LIPA service, may be further determined by the SeNB.

In conclusion, by means of the above embodiments and alternate embodiments of the disclosure, the method for implementing the switching under the small base station environment is provided. The method can solve how to effectively implement the SIPTO@LN and LIPA@LN functions in the switching process based on service characteristics of the dual links under the complex small base station environment, thereby being beneficial to improving the network performance.

In another embodiment, software is further provided. The software is used to implement the technical solutions described in the above embodiments and the alternate implementation manner.

In another embodiment, a storage medium is further provided. The above-mentioned software is stored in the storage medium. The storage medium includes but not limited to: a compact disk, a flexible disk, a hard disk and an erasable memory, etc.

INDUSTRIAL APPLICABILITY

From the above description, the T-MeNB determines that the UE has already established the SIPTO/LIPA service on the SeNB before switching. The target MeNB retains or releases the SIPTO/LIPA service. The UE is accessed to the source MeNB and the SeNB through the dual links before the switching. The UE is accessed to the target MeNB and the SeNB through the dual links after the switching. The collocated L-GW supporting the SIPTO/LIPA service is arranged on the SeNB. Therefore, the problem in the related art of not considering the processing of the SIPTO/LIPA service in the cross MeNB switching process is solved, thus providing a SIPTO/LIPA service processing method in the cross MeNB switching process.

It should be noted that, terminologies such as "first" and "second" in the specification, claims and accompanying drawings of the disclosure are only used to distinguish similar objects, rather than to describe a special order or a precedence order. It should be understood that objects used in such a way may be interchangeable in a certain cases, such that the embodiments of the disclosure described here can be implemented in an order other than those illustrated or described here. As used herein, the terms "comprises," "comprising," "includes," "including," "has," "having" or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus.

Apparently, those skilled in the art should understand that various modules or steps of the disclosure described above may be implemented by general-purpose computing devices that may be centralized on a single computing device or distributed over a network consisting of a plurality of computing devices. Operationally, the modules or steps may be implemented by program codes executable by the computing devices such that they may be stored in storage devices and executed by the computing devices. Moreover, in some cases, the steps shown or described may be performed in an order different from that shown herein. Or the modules or steps can be made separately into individual integrated circuit modules, or some of them can be made into a single integrated circuit element. Thus, the disclosure is not limited to any particular combination of hardware and software.

The above description is only preferred embodiments of the disclosure and is not intended to limit the disclosure. Those skilled in the art should understand that the disclosure may have various changes and modifications. Any modification, equivalent substitution, improvement and the like made within the spirit and principle of the disclosure should be included in the protection scope of the disclosure.

The invention claimed is:

1. A cross mater base station eNB (MeNB) switching method, comprising:
  determining, by a target MeNB, that a User Equipment (UE) has already established at least one of a Selected Internet Protocol Traffic Offload (SIPTO) service or a Local Internet Protocol Access (LIPA) service on a secondary base station eNB (SeNB) before switching; and
  retaining, by the target MeNB, the at least one of the SIPTO service or the LIPA service,
  wherein the retaining, by the target MeNB, the at least one of the SIPTO service or the LIPA service comprises:
    receiving, by the SeNB, a UE context release message; and
    not releasing, by the SeNB, the at least one of the SIPTO service or the LIPA service;
  wherein the UE is accessed to a source MeNB and the SeNB through dual links before the switching, and the UE is accessed to the target MeNB and the SeNB through the dual links after the switching, and a collocated Local GateWay (L-GW) supporting the at least one of the SIPTO service or the LIPA service is arranged on the SeNB.

2. The method according to claim 1, wherein in a condition in which the target MeNB determines to retain the at least one of the SIPTO service or the LIPA service, the retaining, by the target MeNB, the at least one of the SIPTO service or the LIPA service comprises:
  acquiring, by the target MeNB, service bearer information of the at least one of the SIPTO service the LIPA service; and
  sending, by the target MeNB, the service bearer information to a Mobile Management Entity (MME).

3. The method according to claim 2, wherein in the condition in which the target MeNB determines to retain the at least one of the SIPTO service or the LIPA service, the retaining, by the target MeNB, the at least one of the SIPTO service or the LIPA service further comprises:
  sending, by the target MeNB, the service bearer information to the SeNB.

4. The method according to claim 3, wherein the sending, by the target MeNB, the service bearer information to the SeNB comprises:
  sending, by the target MeNB, a SeNB adding request or a SeNB modification request to the SeNB, wherein the SeNB adding request or the SeNB modification request carries the service bearer information.

5. The method according to claim 2, wherein the service bearer information comprises at least one of the followings:
  an Evolution Radio Access Bearer Identifier (ERAB ID), a correlation ID or address information of the L-GW.

6. The method according to claim 2, wherein the acquiring, by the target MeNB, the service bearer information of the at least one of the SIPTO service or the LIPA service comprises:
  receiving, by the target MeNB, a switching request from the source MeNB, wherein the switching request carries the service bearer information.

7. The method according to claim 2, wherein the sending, by the target MeNB, the service bearer information to the MME comprises:

sending, by the target MeNB, a path switching request to the MME, wherein the path switching request carries the service bearer information.

8. The method according to claim 1, wherein after the target MeNB retains the at least one of the SIPTO, or LIPA service, the method further comprises:

sending, by the target MeNB, at least IP address information of the collocated L-GW to the MME.

9. The method according to claim 8, wherein the sending, by the target MeNB, at least the IP address information of the collocated L-GW to the MME comprises:

sending, by the target MeNB, to the MME, at least one of the IP address information of the collocated L-GW or indication information used to indicate a position where the collocated L-GW is arranged.

10. The method according to claim 9, wherein the indication information comprises one of the followings:

a global identifier of the SeNB where the collocated L-GW is located; or an indicator used to indicate that the collocated L-GW is located on the SeNB.

11. A cross master base station eNB (MeNB) switching method, comprising:

acquiring, by a target MeNB, Internet Protocol (IP) address information of a collocated Local GateWay (L-GW) on a secondary base station eNB (SeNB); and sending, by the target MeNB, at least the IP address information to a Mobile Management Entity (MME), wherein a User Equipment (UE) is accessed to a source MeNB and is not accessed to any SeNB before switching, and the UE is accessed to the target MeNB and the SeNB through dual links after the switching, and the collocated L-GW supporting at least one of a Selected Internet Protocol Traffic Offload (SIPTO) or Local Internet Protocol Access (LIPA) service is arranged on the SeNB-, and wherein the acquiring, by the target MeNB, IP address information of the collocated L-GW on the SeNB comprises:

receiving, by the target MeNB, a switching request sent by the source MeNB, wherein the switching request carries the IP address information; or receiving, by the target MeNB, a SeNB adding request confirmation message sent by the SeNB, wherein the SeNB adding request confirmation message carries the IP address information.

12. The method according to claim 11, wherein the sending, by the target MeNB, at least the IP address information to the MME comprises:

sending, by the target MeNB, to the MME, at least one of the IP address information or indication information used to indicate a position where the collocated L-GW is arranged.

13. The method according to claim 12, wherein the indication information comprises one of the followings:

a global Identifier of the SeNB where the collocated L-GW is located; or an indicator used to indicate that the collocated L-GW is located in the SeNB.

* * * * *